(12) United States Patent  (10) Patent No.: US 6,463,829 B2
Torii et al.  (45) Date of Patent: Oct. 15, 2002

(54) GEARED MOTOR HAVING A REINFORCED GEAR HOUSING

(75) Inventors: Katsuhiko Torii, Hamamatsu (JP); Hiroaki Yamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/819,714

(22) Filed: Mar. 29, 2001

(65) Prior Publication Data

US 2002/0047379 A1 Apr. 25, 2002

(30) Foreign Application Priority Data

Mar. 30, 2000 (JP) ........................................ 2000-093769

(51) Int. Cl.⁷ ............................................. F16H 57/02
(52) U.S. Cl. ..................................... 74/606 R; 74/425
(58) Field of Search ............................ 310/78; 74/425, 74/606 R, 89.2, 89.22; 192/223.2, 38

(56) References Cited

U.S. PATENT DOCUMENTS

| | | | |
|---|---|---|---|
| 5,185,544 A | * 2/1993 | Takada | 310/157 |
| 5,216,929 A | * 6/1993 | Ochiai et al. | 74/425 |
| 5,338,995 A | * 8/1994 | Takada | 310/254 |
| 5,533,425 A | * 7/1996 | Mabee | 188/171 |
| 5,650,677 A | * 7/1997 | Furukawa et al. | 310/58 |
| 5,836,219 A | * 11/1998 | Klingler et al. | 74/425 |
| 6,182,523 B1 | * 2/2001 | Nomerange | 310/90 |
| 6,242,824 B1 | * 6/2001 | Torii et al. | 29/596 |
| 6,288,464 B1 | * 9/2001 | Torii et al. | 192/223.2 |
| 6,382,384 B2 | * 5/2002 | Torii et al. | 192/223.2 |
| 6,386,056 B1 | * 5/2002 | Bachnak et al. | 74/425 |
| 6,390,264 B2 | * 5/2002 | Torii et al. | 192/223.2 |
| 6,393,929 B1 | * 5/2002 | Quere et al. | 74/411 |

FOREIGN PATENT DOCUMENTS

| | | |
|---|---|---|
| JP | 60-177651 | 11/1985 |
| JP | 2-53251 | 4/1990 |
| JP | 2-60460 | 5/1990 |
| JP | 7-298549 | 11/1995 |

* cited by examiner

Primary Examiner—Douglas C. Butler
Assistant Examiner—Devon Kramer
(74) Attorney, Agent, or Firm—Law Offices of David G. Posz

(57) ABSTRACT

In a geared motor, a gear housing that is securely connected to a yoke housing is molded in one piece from a synthetic resin material. The gear housing includes a motor securing segment, a worm housing segment, a wheel housing segment and a reinforcing segment. The reinforcing segment is positioned substantially on an opposite side of the worm housing segment with respect to the wheel housing segment. Furthermore, the reinforcing segment includes an air passage that communicates an interior of the yoke housing to atmosphere.

7 Claims, 7 Drawing Sheets

US 6,463,829 B2

GEARED MOTOR HAVING A REINFORCED GEAR HOUSING

CROSS REFERENCE TO RELATED APPLICATION

This application is based on and incorporates herein by reference Japanese Patent Application No. 2000-93769 filed on Mar. 30, 2000.

BACKGROUND OF THE INVENTION

1. Field of the Invention

The present invention relates to a geared motor.

2. Description of Related Art

As shown in FIG. 8, a geared motor 81 including a motor main body 82 and a speed reducing arrangement 83 secured to the motor main body 82 has been commonly used, for example, as a motor of a power window system. The motor main body 82 has a yoke housing 84 that receives an armature in a rotatable manner. The speed reducing arrangement 83 has a gear housing 88. The gear housing 88 includes a worm housing segment 85, a wheel housing segment 86 and an air passage accommodating segment 87. The worm housing segment 85 receives a worm shaft that extends out from one end of a rotatable shaft of the armature. The wheel housing segment 86 receives a worm wheel 89 that is meshed with the worm shaft.

The worm wheel 89 is connected to an output plate 91 via a rubber damper 90 received in a recess formed in the worm wheel 89. The output plate 91 is connected to an output shaft 92 that extends through and rotatably supported in a through hole of a shaft receiving portion 86a formed in the wheel housing segment 86. The shaft receiving portion 86a rotatably supports the worm wheel 89. When the worm shaft is rotated by a driving force transmitted from the rotatable shaft of the armature, the output shaft 92 is rotated via the worm wheel 89, the rubber damper 90 and the output plate 91. A vehicle door window glass moves downward or upward in a vertical direction based on rotation of the output shaft 92.

The air passage accommodating segment 87 formed in the gear housing 88 is arranged at a base of the worm housing segment 85. An air passage 93 is formed in the air passage accommodating segment 87. The air passage 93 extends from an outer surface of the air passage accommodating segment 87 to an interior of the yoke housing 84.

The geared motor 81 is assembled by connecting the motor main body 82 to the speed reducing unit 83. More specifically, the geared motor 81 is assembled by connecting the yoke housing 84 to the gear housing 88, for example, with bolts and nuts (not shown).

In the geared motor 81, the yoke housing 84 of the motor main body 82 is typically molded from a metal material, and the gear housing 88 of the speed reducing arrangement 83 is typically molded from a resin material. Thus, during the vertical movement of the window glass with the aid of driving force conducted from the geared motor 81, if a load applied on the window glass is excessively large, a corresponding large force is applied on the worm shaft via the worm wheel 89. This large force flexes the gear housing 88 that has a relatively small strength. That is, although the gear housing 88 has the air passage accommodating segment 87 including the air passage 93, the air passage accommodating segment 87 is only arranged at the base of the gear housing 88. Thus, the air passage accommodating segment 87 does not reinforce the worm housing segment 85 and the wheel housing segment 86. Thus, when the gear housing 88 is flexed, disengagement between the worm wheel 89 and the worm shaft is likely to occur.

The present invention addresses the above disadvantage. Thus, it is an objective of the present invention to provide a geared motor including a gear housing that has an improved strength provided by a simple structure to withstand flexing caused by a larger force generated between a worm wheel and a worm shaft, thereby reducing a possibility of disengagement between the worm wheel and the worm shaft upon application of the larger force therebetween.

SUMMARY OF THE INVENTION

It is another objective of the present invention to provide a geared motor having a gear housing that has an improved strength provided by a simple structure including an effective air passage communicating an interior of the geared motor to atmosphere such that the gear housing can withstand flexing caused by a larger force generated between a worm wheel and a worm shaft, thereby reducing a possibility of disengagement between the worm wheel and the worm shaft upon application of the larger force therebetween.

To achieve the objectives of the present invention, there is provided a geared motor including a yoke housing and a gear housing. The yoke housing has an opening and receives a motor unit. The gear housing is made of a resin material. Also, the gear housing covers the opening of the yoke housing. Furthermore, the gear housing includes a worm housing segment and a wheel housing segment. The worm housing segment receives a worm shaft that is connected to the motor unit. The wheel housing segment receives a worm wheel that is meshed with the worm shaft. The worm shaft and the worm wheel cooperate together to transmit a rotational force of the motor unit to an output shaft connected to the worm wheel for outputting the rotational force from the geared motor. The geared motor further includes a reinforcing segment that is integrally formed with the worm housing segment in the gear housing. The reinforcing segment extends in a direction away from the yoke housing along the worm housing segment at least from a base end of the worm housing segment beyond an engaging point where the worm shaft is meshed with the worm wheel. The reinforcing segment includes an air passage that communicates an interior of the yoke housing to atmosphere.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A geared motor of a power window system according to one embodiment of the present invention will now be described with reference to accompanying drawings.

Figure 1:
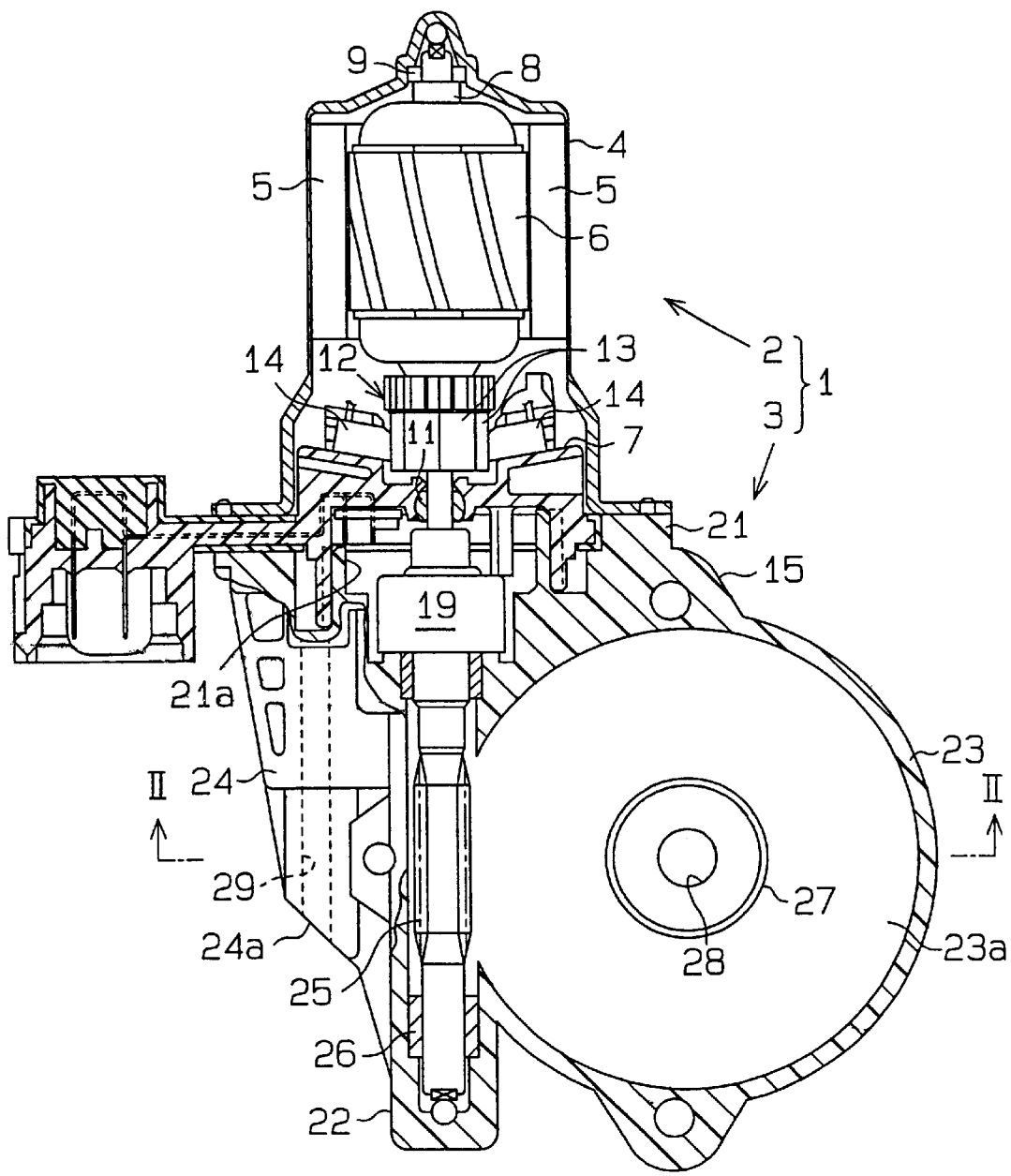
FIG. 1 is a schematic cross-sectional view of a geared motor according to an embodiment of the present invention.

With reference to FIG. 1, the geared motor 1 includes a motor main body 2 and a speed reducing arrangement 3. The motor main body 2 includes a generally cylindrical metal yoke housing 4, a plurality of magnets 5, an armature 6, a power supply arrangement 7 and a commutator 12 (together acting as a motor unit). The yoke housing 4 has an opening at one end (lower side in FIG. 1) and a base wall at the other end (upper side in FIG. 1). The magnets 5 are secured to an inner peripheral surface of the yoke housing 4. The armature 6 is rotatably received in the yoke housing 4. The power supply arrangement 7 is secured to the open end (opening) of the yoke housing 4.

The armature 6 has a rotatable shaft 8. A base end of the rotatable shaft 8 is rotatably supported by a bearing 9 that is secured to a base of the yoke housing 4. A distal end of the rotatable shaft 8 is rotatably supported by a bearing 11 arranged in the power supply arrangement 7. The commutator 12 is secured to the rotatable shaft 8 adjacent to the power supply arrangement 7. The power supply arrangement 7 further includes brushes 14 which are slidably engaged with commutator segments 13 of the commutator 12.

Figure 4:
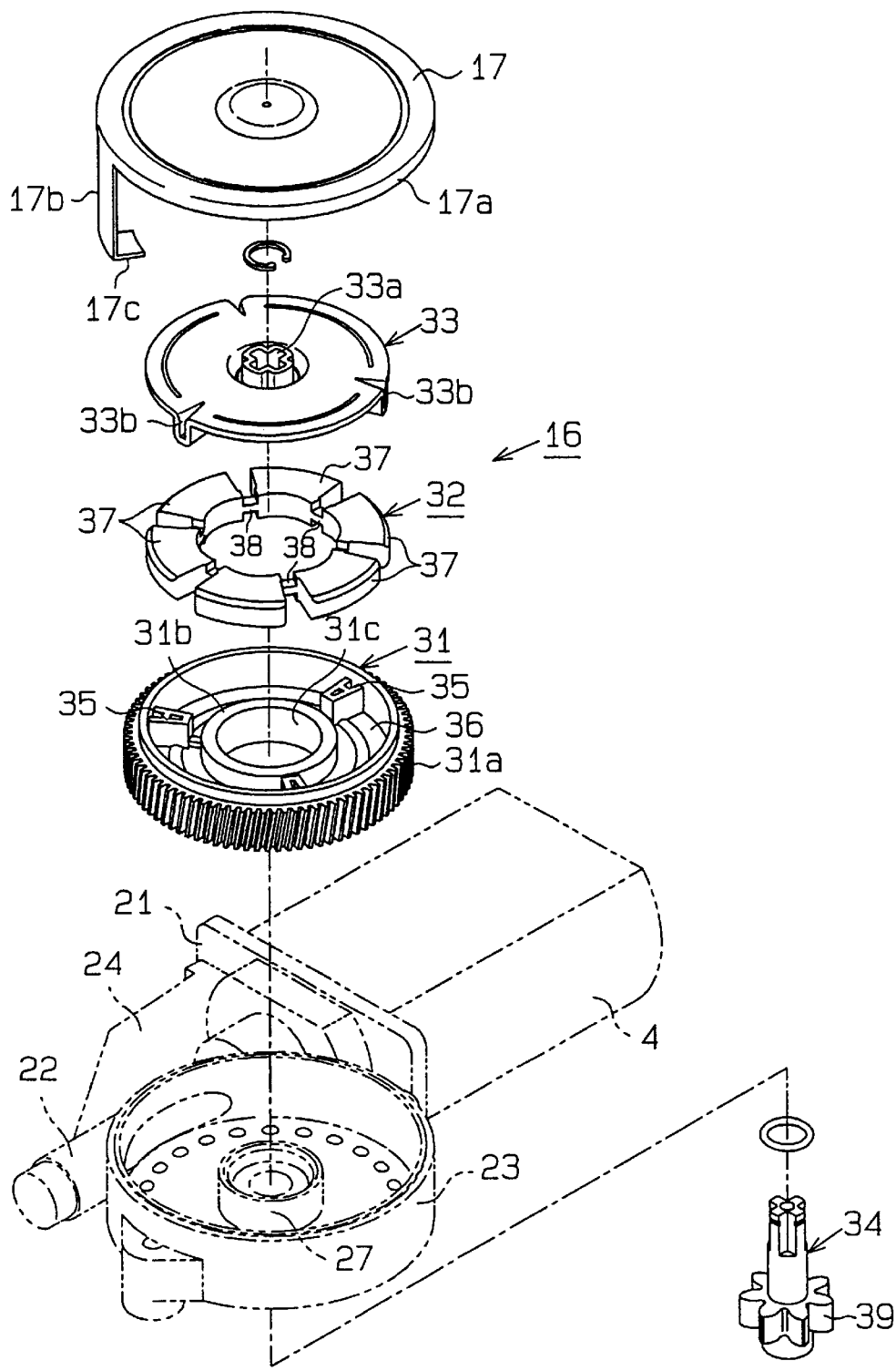
FIG. 4 is an exploded view illustrating an speed reducing unit.

The speed reducing arrangement 3 includes a gear housing 15, a speed reducing unit 16 and a cover 17 (FIG. 4).

The gear housing 15 is an integral one piece body made of a synthetic resin. The gear housing 15 includes a motor securing segment 21, a worm housing segment 22, a wheel housing segment 23 and a reinforcing segment 24. The motor securing segment 21 is securely connected to the yoke housing 4 such that the motor securing segment 21 securely holds the power supply arrangement 7. The motor securing segment 21 has a recess 21a on the yoke housing 4 side thereof to accommodate portion of the power supply arrangement 7 and a clutch 19 that is connected to the rotatable shaft 8.

The worm housing segment 22 is formed below the motor securing segment 21 in the gear housing 15 to extend toward the bottom of FIG. 1. The worm housing segment 22 is communicated with the recess 21a. Furthermore, the worm housing segment 22 houses a worm shaft 25 that is connected to the rotatable shaft 8 through the clutch 19. A distal end of the worm shaft 25 is rotatably supported by a bearing 26 arranged in the worm housing segment 22. The clutch 19 transmits a driving force from the rotatable shaft 8 to the worm shaft 25 but does not transmit a driving force from the worm shaft 25 to the rotatable shaft 8.

Figure 2:
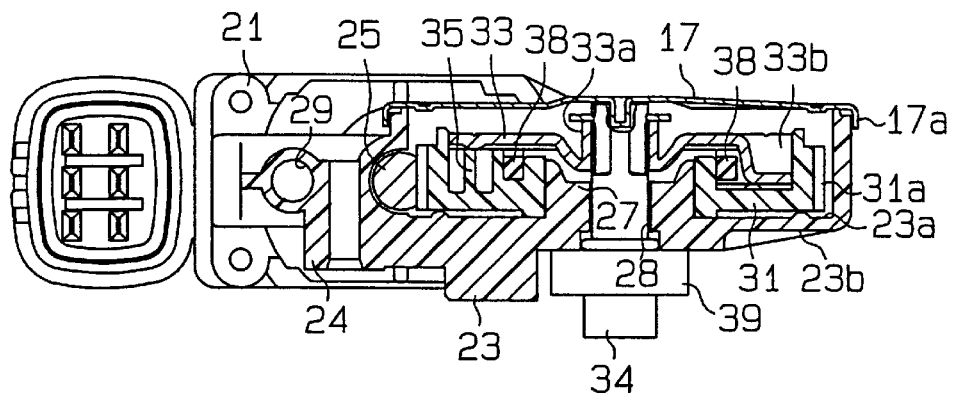
FIG. 2 is a cross-sectional view along line II—II in FIG. 1.

On one side (right side in FIG. 1) of the worm housing segment 22, there is formed the generally cylindrical wheel housing segment 23 that is communicated with the worm housing segment 22. As shown in FIG. 2, a shaft supporting portion 27 protrudes from a center of an inner bottom wall surface 23a of the wheel housing segment 23. A shaft hole 28 penetrates through the shaft supporting portion 27 in an axial direction of the shaft supporting portion 27. The speed reducing unit 16 is received in the wheel housing segment 23.

In this embodiment, the reinforcing segment 24 is formed substantially on the opposite side (left side in FIG. 1) of the worm housing segment 22 with respect to the wheel housing segment 23. More particularly, the reinforcing segment 24 extends together with the worm housing segment 22 from a lower end of the motor securing segment 21 to a position where a bearing 26 supports the worm shaft 25.

An air passage 29 is formed in a lower slant surface 24a of the reinforcing segment 24. The air passage 29 extends upwardly from the lower surface 24a in a direction parallel to the worm shaft 25 and is communicated to the recess 21a of the motor securing segment 21. Furthermore, the reinforcing segment 24 extends to a point (adjacent to the bearing 26) distal to an engaging point where the worm shaft 25 is meshed with a worm wheel 31 (FIG. 4). As a result, the recess 21a of the motor securing segment 21, i.e., the interior of the yoke housing 4 is communicated to the atmosphere through the air passage 29. The opening of the air passage 29 formed in the lower surface 24a of the reinforcing segment 24 has an ellipsoidal shape due to the fact that the lower surface 24a is slanted, i.e., the lower surface 24a extends obliquely relative to the air passage 29. The ellipsoidal opening of the air passage 29 can provide a cross-sectional area larger than that of a circular opening that is formed in a flat surface (see FIG. 2).

The speed reducing unit 16 arranged in the worm housing segment 22 of the gear housing 15 will be briefly described with reference to FIG. 4. The speed reducing unit 16 includes the worm wheel 31, a rubber damper 32, an output plate 33 and an output shaft 34.

The worm wheel 31 has a generally cylindrical shape and is made of a synthetic resin material. Furthermore, the worm wheel 31 has a bottom wall and a gear portion 31a. The gear portion 31a is arranged along an outer peripheral surface of the worm wheel 31 to mesh with the worm shaft 25. At a center of the worm wheel 31, there is formed a shaft portion 31b that has a shaft hole 31c penetrating through the shaft portion 31b along a central axis of the shaft portion 31b. The shaft hole 31c receives the shaft supporting portion 27 of the wheel housing segment 23 such that the worm wheel 31 is rotatably supported by the shaft supporting portion 27 of the wheel housing segment 23. Thus, when the rotatable shaft 8 of the armature 6 rotates to rotate the worm shaft 25, a rotational force of the worm shaft 25 is transmitted to the worm wheel 31. As a result, the worm wheel 31 rotates about a central axis of the shaft portion 31b. In the worm wheel 31, an annular space is defined between the gear portion 31a and the shaft portion 31b. Within this annular space, three engageable supporting portions 35 are formed at equal angular intervals. The three engageable supporting portions 35 divide the annular space into three fan shaped sections. These fan shaped sections constitute damper receiving portions 36 that are provided to receive the rubber damper 32.

The rubber damper 32 is molded in an annular shape from a rubber material. The rubber damper 32 includes six fan shaped damper segments 37. The damper segments 37 are connected together by connection segments 38 located in an inner peripheral area of the rubber damper 32. A couple of the damper segments 37 are received in each damper receiving portion 36, so that each engageable supporting portion 35 is placed between the adjacent couples of the damper segments 37. As a result, when the worm wheel 31 rotates about the central axis of the shaft portion 31b, the rubber damper 32 rotates along with the worm wheel 31 due to engagement between the rubber damper 32 and the engageable supporting portions 35 of the worm wheel 31.

The output plate 33 engages between the two damper segments 37 received in each damper receiving portion 36. The output plate 33 is a generally disc-like shaped metal plate. At a center of the output plate 33, there is formed a shaft engaging portion 33a to which the output shaft 34 is securely connected. At one side (lower side in FIG. 4) of the output plate 33, three engaging protrusions 33b are arranged at equal angular intervals. By mounting the output plate 33 over the rubber damper 32, each engaging protrusion 33b of the output plate 33 is positioned between the corresponding adjacent damper segments 37 received in each damper receiving portion 36. Thus, when the worm wheel 31 rotates about the central axis of the shaft portion 31b, the output plate 33 is rotated via the rubber damper 32.

Figure 3:
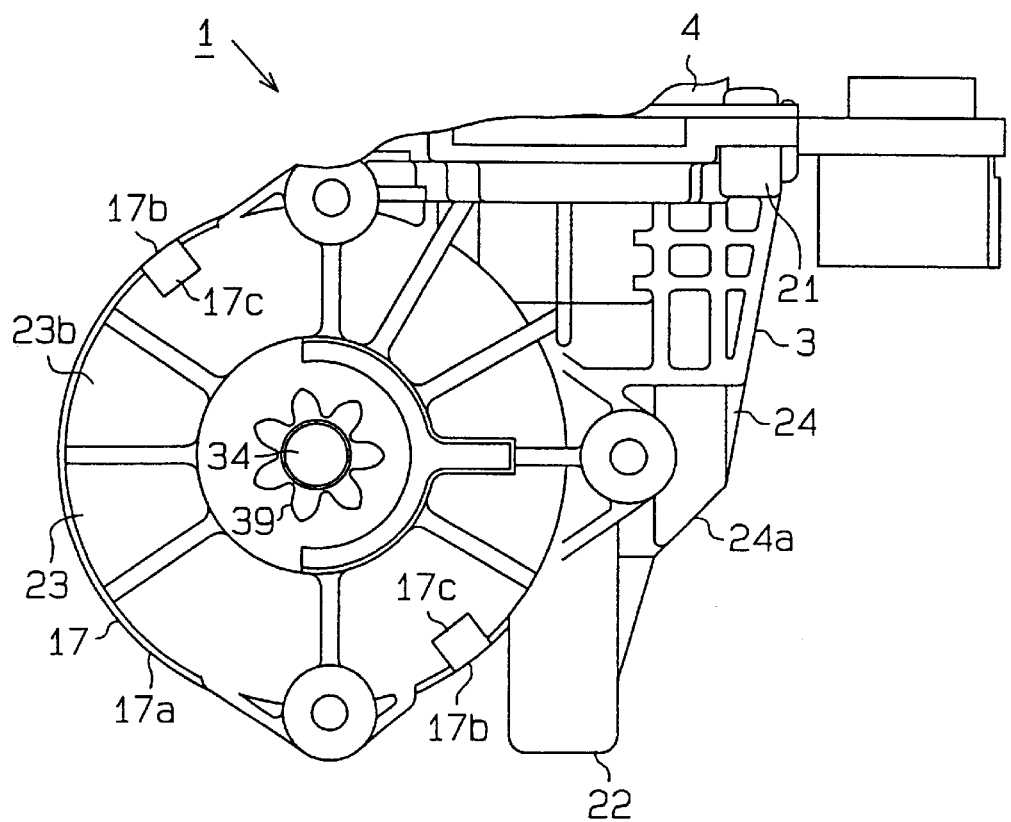
FIG. 3 is a partial view of the geared motor shown in FIGS. 1 and 2.

The output shaft 34 that is to be secured to the shaft engaging portion 33a of the output plate 33 is first inserted through the shaft hole 28 of the shaft supporting portion 27 of the wheel housing segment 23. The output shaft 34 is rotatably supported in the shaft hole 28. As best seen in FIGS. 2 and 3, a gear 39 is formed around a part of the output shaft 34 which protrudes downwardly from the shaft hole 28 of the wheel housing segment 23. The gear 39 is connected to a window glass driving mechanism (not shown) that moves the vehicle window glass up and down. Thus, when the output plate 33 rotates, the output shaft 34 rotates to drive the window glass driving mechanism.

Figure 5:
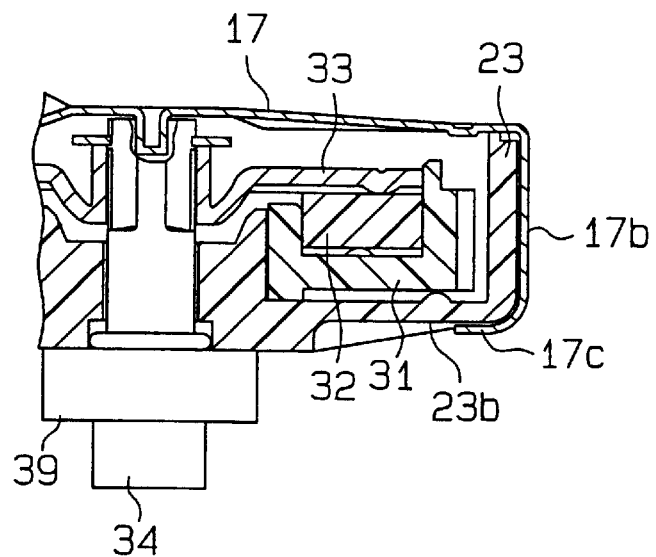
FIG. 5 is an enlarged partial cross sectional view illustrating a connection between a cover and a wheel housing segment of the geared motor according to the embodiment.

An open end of the wheel housing segment 23 that receives the speed reducing unit 16 is closed by the cover 17. The cover 17 is a generally disc-like metal plate. An outer peripheral portion of the cover 17 has a flange-like fitting portion 17a that extends toward the wheel housing segment 23. The cover 17 is fitted around an outer peripheral of the open end of the wheel housing segment 23 via the fitting portion 17a. Furthermore, the cover 17 includes a couple of opposing holding arms 17b that extend out from the fitting portion 17a in an axial direction along an outer peripheral surface of the wheel housing segment 23. A distal end of each holding arm 17b is bent radially inwardly to form an engaging piece 17c. As shown in FIG. 5, the engaging pieces 17c engage a bottom outer surface 23b of the wheel housing segment 23 which is located on a side opposite to the open end of the wheel housing segment 23. As a result, the cover 17 is completely securely connected to the wheel housing segment 23 by the engagement of the engaging piece 17c of each holding arm 17b with the bottom outer surface 23b of the wheel housing segment 23.

The characteristics of the geared motor 1 will now be described.

(1) The reinforcing segment 24 is provided adjacent to the worm housing segment 22 of the gear housing 15. Furthermore, the reinforcing segment 24 extends together with the worm housing segment 22 from the lower end of the motor securing segment 21 to the lower end part of the worm housing segment 22, i.e., to the position where the bearing 26 is placed.

Thus, the worm housing segment 22 is reinforced by the reinforcing segment 24 extending along the worm housing segment 22. Therefore, even if a relatively large force is applied to the worm shaft 25 from the worm wheel 31, the worm housing segment 22 is not easily flexed. As a result, the worm wheel 31 and the worm shaft 25 are not easily disengaged from each other upon application of such a large force.

In addition, the worm housing segment 22 is not easily flexed even if a relatively large force is applied to the worm housing segment 22 in a lateral direction along a plane in which the reinforcing segment 24 and the wheel housing segment 23 are located. This is due to the fact that the reinforcing segment 24 is positioned substantially on the opposite side of the worm housing segment 22 with respect to the wheel housing segment 23.

(2) Furthermore, in the reinforcing segment 24, there is provided the air passage 29 that extends upwardly from the lower surface 24a of the reinforcing segment 24 to communicate with the recess 21a formed in the motor securing segment 21. Thus, the reinforcing segment 24 increases the strength of the gear housing 15, i.e., the strength of the worm housing segment 22 and also allows exchange of the air between the interior and the exterior of the motor main body 2.

(3) Furthermore, the lower surface 24a of the reinforcing segment 24 is slanted, so that the opening of the air passage located in the lower surface 24a of the reinforcing segment 24 has a generally ellipsoidal shape that provides a greater opening area in comparison to that of the circular shape. As a result, the opening of the air passage 29 becomes more difficult to be clogged, for example, with rain water or dirt particles due to the increased opening area.

More particularly, the geared motor 1 is typically mounted on a vehicle door in the orientation shown in FIG. 1 (i.e., a longitudinal axis of the geared motor 1 extends in a vertical direction of the vehicle door). In the vehicle door having the geared motor 1, the rain water runs down along the door window glass and penetrates into an interior of the vehicle door. In the interior of the vehicle door, the rain water continues to run down along the motor main body 2 and also along the speed reducing arrangement 3. At this time point, the rain water runs down along the lower surface 24a of the reinforcing segment 24. However, since the opening of the air passage 29 has the larger opening area, the opening of the air passage 29 is not easily clogged with the rain water. As a result, even if a negative pressure is developed in the interior of the motor main body 2, the rain water is not easily sucked into the interior of the motor main body 2. Furthermore, even if the water is sucked into the air passage 29, the water in the air passage 29 can be easily pulled out from the air passage 29 by the gravity since the air passage 29 extends in the direction of gravity. p (4) Also in the described embodiment, the cover 17 includes the holding arms 17b that extend out from the fitting portion 17a in the axial direction along the outer peripheral surface of the wheel housing segment 23. Furthermore, the distal end of each holding arm 17b is bent radially inwardly to form the engaging piece 17c. As a result, when the fitting portion 17a of the cover 17 is fitted around the open end of the wheel housing segment 23, and the engaging piece 17c of each holding arm 17b is engaged with the bottom outer surface 23b of the wheel housing segment 23, the cover 17 is securely connected to the wheel housing segment 23.

Furthermore, the cover 17 can be connected to the wheel housing segment 23 with the described simple connecting structure, namely, the engaging pieces 17c of the holding arms 17b and the bottom outer surface 23b of the wheel housing segment 23. Therefore, a bending process required in manufacturing of the connection between the cover 17 and the wheel housing segment 23 is further simplified. As a result, the manufacturing costs can be reduced. Also, the described simple connecting structure provides a strong connection between the cover 17 and the wheel housing segment 23.

Figure 9:
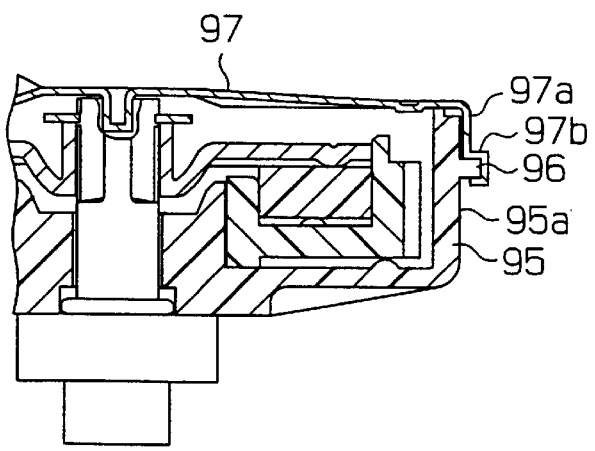
FIG. 9 is a partial cross-sectional view illustrating a connection between a cover and a wheel housing segment in a previously proposed geared motor.
Figure 8:
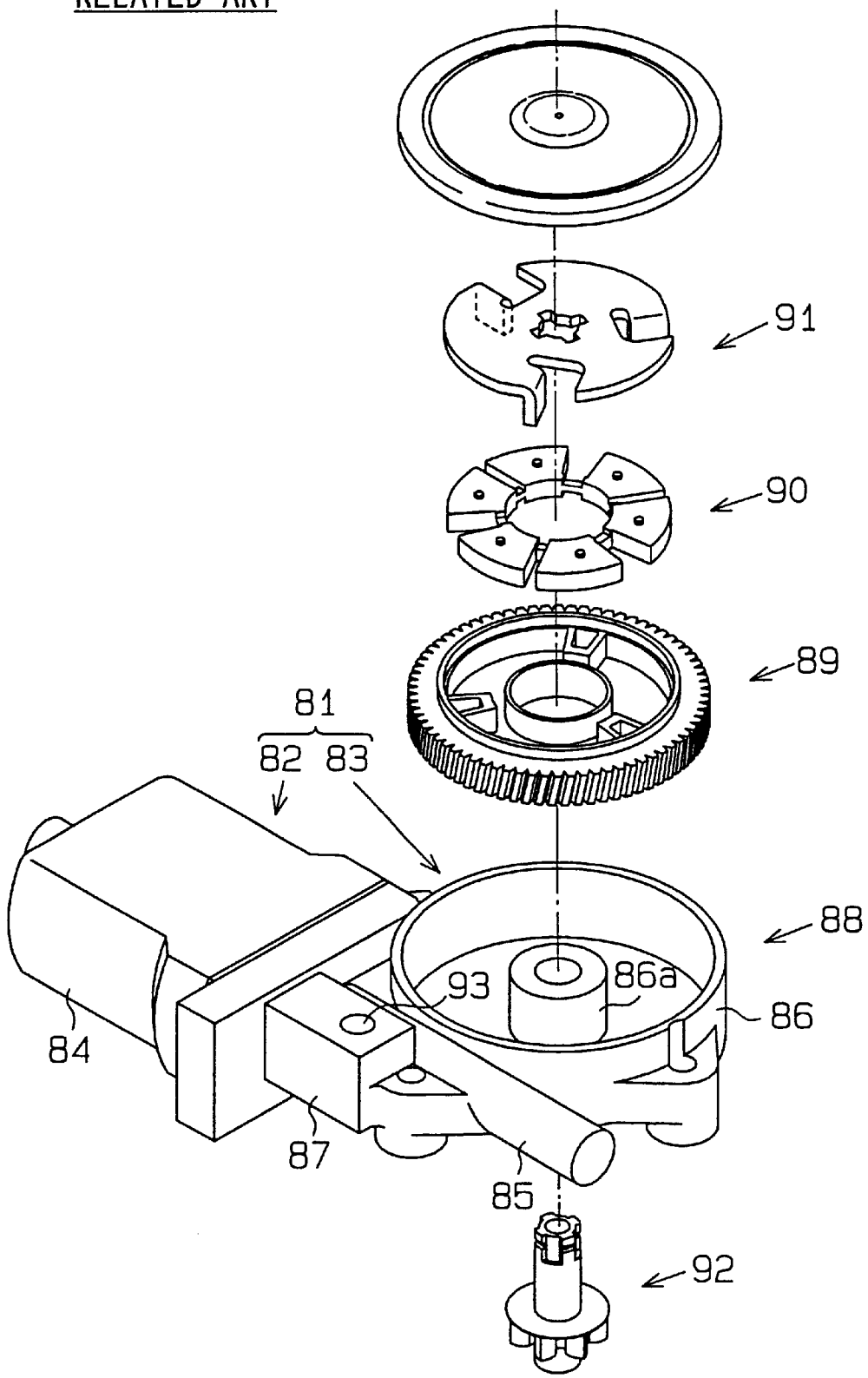
FIG. 8 is an exploded perspective view of a previously proposed geared motor.

More particularly, in a case of a previously proposed geared motor, as shown in FIG. 9, an engaging protrusion 96 is formed in an outer peripheral surface 95a of a wheel housing segment 95. Furthermore, an engaging piece 97b extends from a fitting portion 97a of a cover 97 and is bent to conform with an contour of the engaging protrusion 96. When the engaging piece 97b is engaged with the engaging protrusion 96, the cover 97 is securely connected to the wheel housing segment 95.

Unlike this previously proposed geared motor in which the engaging protrusion 96 is formed in the outer peripheral surface 95a of the wheel housing segment 95, the wheel housing segment 23 according to the present embodiment has no such a protrusion. As a result, according to the present embodiment, a profile of the wheel housing segment 23 is reduced, and a molding process required to form the wheel housing segment 23 is simplified.

Furthermore, in the previously proposed geared motor, the engaging piece 97b of the cover 97 is bent along the engaging protrusion 96, so that the bending process of the engaging piece 97b of the cover 97 is relatively complicated. That is, in the case of the engaging piece 97b shown in FIG. 9, three bending steps are required. Contrary to this, in the case of the cover 17 according to the present embodiment, only one bending step is required, so that the bending process is more simplified in accordance with the present embodiment.

Furthermore, in the previously proposed geared motor, when a force is applied to the cover 97 in a direction away from the wheel housing segment 95, a portion of the engaging piece 97b that is first bent along the engaging protrusion 96 tends to deform due to the fact that it is not engaged with other member. On the other hand, in the present embodiment, there is no such a bent portion that is not engaged with other member, so that the cover 17 does not deform when a force is applied on the cover 17 in a direction away from the wheel housing segment 23.

The present embodiment is not limited to the above embodiment and can be modified as follows.

Figure 7:
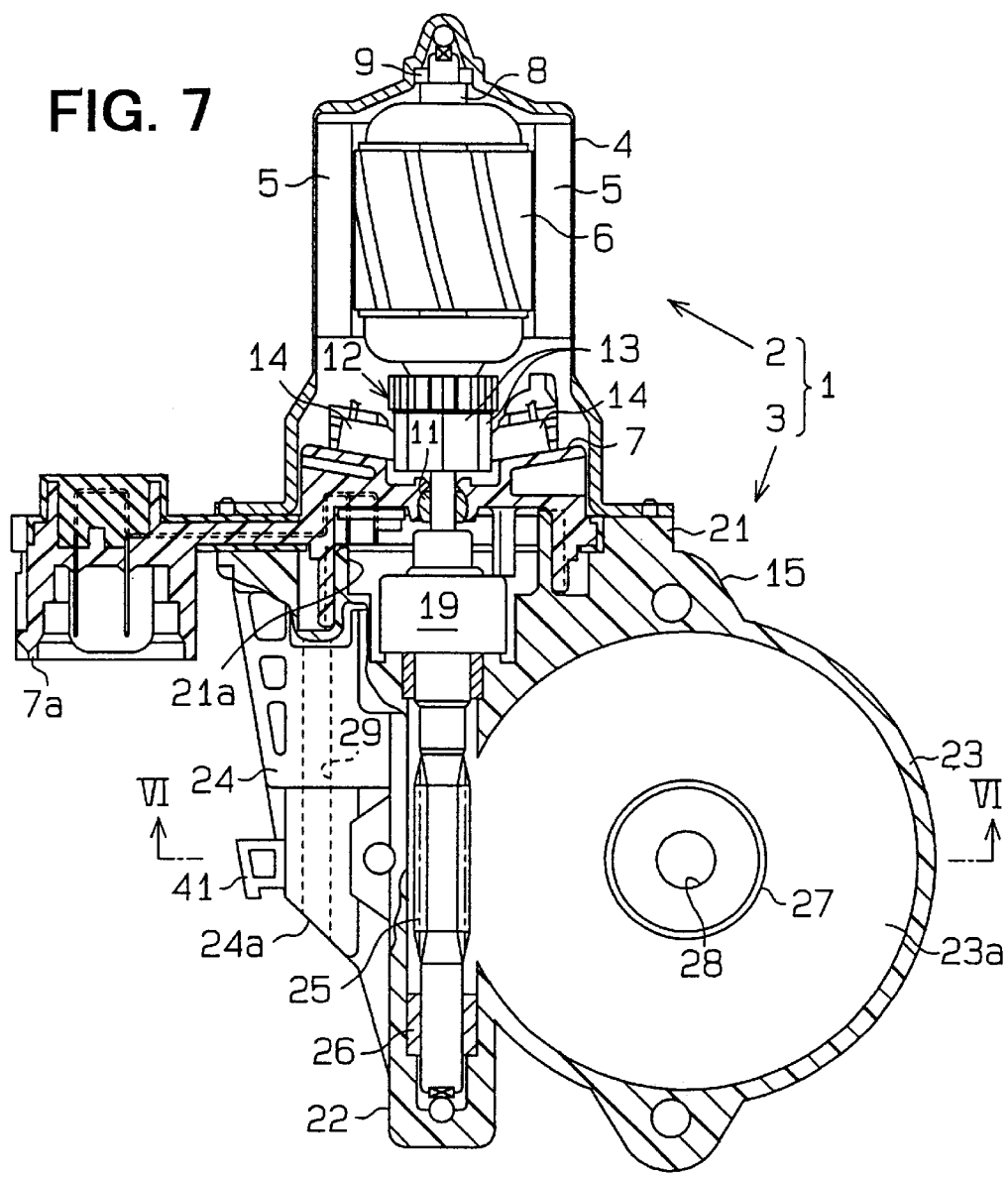
FIG. 7 is a cross-sectional view similar to FIG. 1 showing a lead wire holding clip.

That is, a lead wire holding clip can be integrally formed in the reinforcing segment 24. More specifically, as shown in FIG. 7, the lead wire holding clip 41 is integrally formed in the reinforcing segment 24 of the gear housing 15. In assembling, when a lead wire for supplying electric power is connected to a connector 7a formed in the power supply arrangement 7, the lead wire is securely held in the clip 41, for example, by winding the lead wire around the clip 41 via a through hole formed in the clip 41. In this way, when an external force is applied on the lead wire for some reason, a stress is not applied on a connection between the lead wire and the connector 7a.

Figure 6:
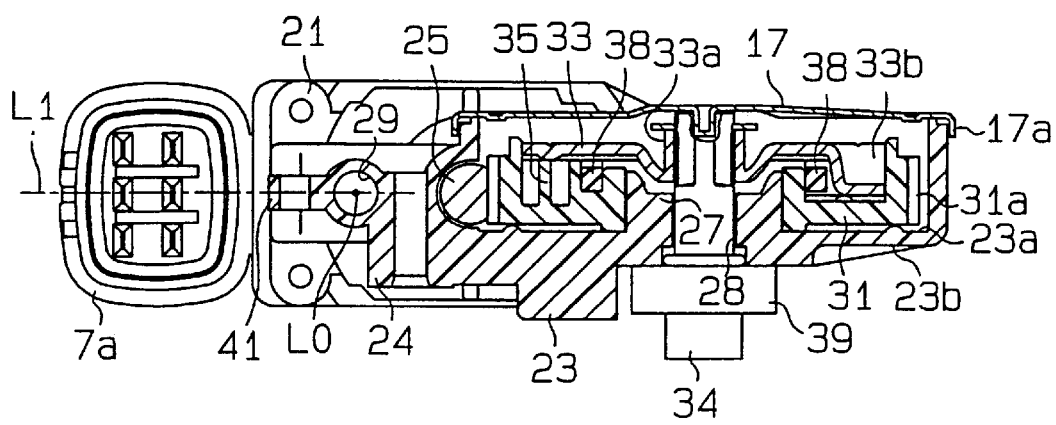
FIG. 6 is a cross-sectional view along line VI—VI in FIG. 7.

In this embodiment, the clip 41 protrudes from the reinforcing segment 24 toward the left side in FIG. 7. Furthermore, as shown in FIG. 6, the clip 41 is symmetrical about a line L1 extending perpendicular to a central axis L0 of the air passage 29 formed in the reinforcing segment 24. As a result, in the process of molding the gear housing 15 from a resin material, the resin material can be evenly distributed on both sides of the line L0 to mold the clip 41 since the clip 41 is formed symmetrically about the line L1 that extends perpendicular to the central axis L0 of the air passage 29, as shown in FIG. 6. As a result, dimensional precision of the gear housing 15 can be improved according to the present embodiment.

The lead wire holding clip 41 can be provided in the previously proposed type of gear housing that has no reinforcing segment 24. In such a case, the lead wire holding clip is formed outside of the worm housing segment such that the lead wire holding clip is symmetrical about a line extending perpendicular to a central axis of the worm shaft received in the worm housing segment. In this way, dimensional precision of the gear housing can also be improved.

Figure 10:
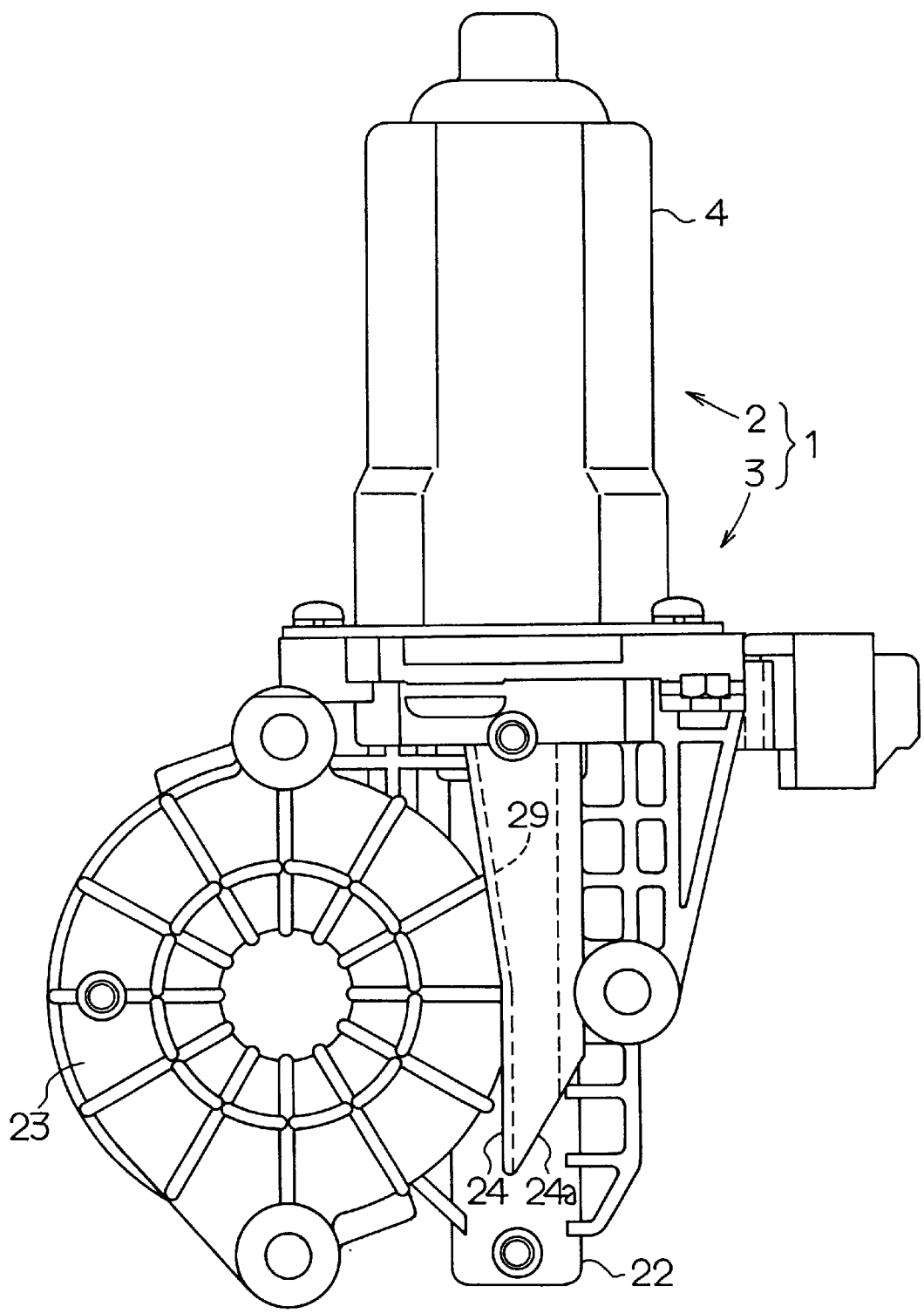
FIG. 10 is a view illustrating a modification of an air passage in the geared motor according to the embodiment of the present invention.

In the described embodiment, the reinforcing segment 24 is made substantially on the opposite side of the worm housing segment 22 with respect to the wheel housing segment 23. However, the reinforcing segment 24 can be formed at any location in the gear housing 15 as long as the reinforcing segment 24 is located adjacent to the worm housing segment 22. For instance, the reinforcing segment 24 can be formed such that a line connecting between the reinforcing segment 24 and the worm housing segment 22 is displaced generally 90 degrees from a line connecting the worm housing segment 22 and the wheel housing segment 23. One example of this configuration is shown in FIG. 10. In FIG. 10, the reinforcing segment 24 is positioned next to the worm housing segment 22 along a direction parallel to a longitudinal axis of the output shaft 34.

Furthermore, the air passage 29 can be modified to a diverging air passage 29 shown in FIG. 10. The air-passage shown in FIG. 10 has an increasing cross-sectional area that increases from the opening of the air passage 29 located in the slant lower surface 24a of the reinforcing segment 24 toward the recess 21a of the motor securing segment 21. By way of example, a rapid decrease in the temperature of the yoke housing 4 with cold rain water could cause development of a negative pressure in the interior of the yoke housing 4. When this happens, the water could be sucked into the air passage 29 from the slant lower surface 24a of the reinforcing segment 24. However, in the diverging air passage 29, when the sucked water reaches an increased diameter portion of the air passage 29, the water tends to spread out over the increased diameter portion of the passage 29. As a result, further penetration of the water can be advantageously prevented.

Additional advantages and modifications will readily occur to those skilled in the art. The invention in its broader terms is therefore, not limited to the specific details, representative apparatus, and illustrative examples shown and described.

What is claimed is:

1. A geared motor comprising:

a yoke housing having an opening, said yoke housing receiving a motor unit;

a gear housing made of a resin material, said gear housing covering said opening of said yoke housing and including a worm housing segment and a wheel housing segment, said worm housing segment receiving a worm shaft that is connected to said motor unit, said wheel housing segment receiving a worm wheel that is meshed with said worm shaft, said worm shaft and said worm wheel cooperating together to transmit a rotational force of said motor unit to an output shaft connected to said worm wheel for outputting said rotational force from said geared motor; and a reinforcing segment that is integrally formed with said worm housing segment in said gear housing, said reinforcing segment extending in a direction away from said yoke housing along said worm housing segment, said reinforcing segment extending at least from a base end of said worm housing segment to beyond an engaging point where said worm shaft is meshed with said worm wheel, said reinforcing segment including an air passage that communicates an interior of said yoke housing to atmosphere.

2. A geared motor according to claim 1, wherein said reinforcing segment is positioned substantially on an opposite side of said worm housing segment with respect to said wheel housing segment.

3. A geared motor according to claim 1, wherein said reinforcing segment is positioned next to said worm housing segment along a direction parallel to a longitudinal axis of said output shaft.

4. A geared motor according to claim 1, wherein said air passage extends substantially linearly along said worm housing segment.

5. A geared motor according to claim 1, wherein said air passage extends substantially parallel to said worm housing segment.

6. A geared motor according to claim 1, wherein a cross-sectional area of said air passage increases toward said interior of said yoke housing.

7. A geared motor according to claim 1, wherein a portion of an outer surface of said reinforcing segment in which an opening of said air passage is located extends obliquely relative to a longitudinal axis of said air passage.

* * * * *